US011578968B1

(12) United States Patent
Capasso et al.

(10) Patent No.: US 11,578,968 B1
(45) Date of Patent: Feb. 14, 2023

(54) COMPACT METALENS DEPTH SENSORS

(71) Applicant: PRESIDENT AND FELLOWS OF HARVARD COLLEGE, Cambridge, MA (US)

(72) Inventors: Federico Capasso, Cambridge, MA (US); Todd Zickler, Cambridge, MA (US); Qi Guo, Cambridge, MA (US); Zhujun Shi, Cambridge, MA (US); Yao-Wei Huang, Cambridge, MA (US); Emma Alexander, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 17/086,197

(22) Filed: Oct. 30, 2020

Related U.S. Application Data

(60) Provisional application No. 62/928,929, filed on Oct. 31, 2019.

(51) Int. Cl.
| | | |
|---|---|---|
| *G01B 11/22* | (2006.01) | |
| *G06T 7/55* | (2017.01) | |
| *G02B 1/00* | (2006.01) | |

(52) U.S. Cl.
CPC .............. *G01B 11/22* (2013.01); *G02B 1/002* (2013.01); *G06T 7/55* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 9,704,250 B1* | 7/2017 | Shah | G06T 7/55 |
| 2018/0184065 A1* | 6/2018 | Zhao | H04N 13/139 |
| 2019/0155302 A1* | 5/2019 | Lukierski | G06T 15/06 |
| 2020/0225386 A1* | 7/2020 | Tsai | G02B 3/0068 |
| 2020/0236315 A1* | 7/2020 | Kimura | G01B 11/2513 |
| 2021/0112201 A1* | 4/2021 | Cho | H01L 27/14605 |

* cited by examiner

*Primary Examiner* — Edemio Navas, Jr.
(74) *Attorney, Agent, or Firm* — Foley & Lardner LLP

(57) ABSTRACT

Disclosed is a depth sensor for determining depth. The depth sensor can include a photosensor, a metalens configured to manipulate light to simultaneously produce at least two images having different focal distances on a surface of the photosensor, and processing circuitry configured to receive, from the photosensor, a measurement of the at least two images having different focal distances. The depth sensor can determine, according to the measurement, a depth associated with at least one feature in the at least two images.

18 Claims, 7 Drawing Sheets

US 11,578,968 B1

COMPACT METALENS DEPTH SENSORS

CROSS-REFERENCE TO RELATED PATENT APPLICATIONS

This application claims the benefit and priority of U.S. Provisional Patent Application No. 62/928,929, filed on Oct. 31, 2019, the entirety of which is incorporated by reference herein.

STATEMENT OF FEDERALLY SPONSORED RESEARCH OR DEVELOPMENT

This invention was made with Government support under 1718012 and 1212928 awarded by the National Science Foundation; and under FA9550-16-1-0156 and FA9550-14-1-0389 awarded by the United States Air Force/U.S. Air Force Office of Scientific Research. The Government has certain rights in the invention.

BACKGROUND

Metalenses are optical elements to manipulate electromagnetic waves such as light. Metalenses may enable various applications that may be impractical to achieve with traditional diffractive lenses. For example, metalenses often have a smaller form factor than traditional diffractive lenses and are therefore suited to micro or lightweight applications.

SUMMARY

One embodiment of the present disclosure relates to a depth sensor for determining depth, including a photosensor, a metalens configured to manipulate light to simultaneously produce at least two images having different focal distances on a surface of the photosensor, and processing circuitry configured to receive, from the photosensor, a measurement of the at least two images having different focal distances, and determine, according to the measurement, a depth associated with at least one feature in the at least two images.

In some embodiments, the processing circuitry is configured to determine the depth associated with the at least one feature at a pixel of the at least two images. In some embodiments, the processing circuitry is configured to generate a confidence metric associated with the depth at the pixel. In some embodiments, the processing circuitry is configured to determine the depth by performing fewer than 700 floating point operations (FLOPs). In some embodiments, the depth sensor further includes a filter configured to at least one of: pass coherent light to the metalens for manipulation, or extend an operating range or distance of the metalens from a physical location of the at least one feature, to determine the depth of the at least one feature. In some embodiments, the filter includes a bandpass filter. In some embodiments, the depth sensor further includes an aperture configured to pass a portion of available light to the metalens for manipulation, wherein the metalens is positioned between the aperture and the photosensor. In some embodiments, the processing circuitry is configured to determine the depth by calculating a plurality of depth estimations for the at least one feature, calculating a confidence metric for each of the plurality of depth estimations, and selecting a depth estimation from the plurality of depth estimations according to the confidence metric for each of the plurality of depth estimations. In some embodiments, the processing circuitry is configured to calculate the plurality of depth estimations by performing a gradient descent calculation. In some embodiments, the photosensor is configured to perform the measurement of the at least two images simultaneously. In some embodiments, the at least two images are produced on different portions of the surface of the photosensor.

Another embodiment of the present disclosure relates to a method for determining depth including manipulating light, using a metalens, to simultaneously produce at least two images having different focal distances on a surface of a photosensor, wherein the at least two images are produced on different portions of the surface, receiving, by processing circuitry from the photosensor, a measurement of the at least two images having different focal distances, and determining, by the processing circuitry according to the measurement, a depth associated with at least one feature in the at least two images.

In some embodiments, the method includes determining, by the processing circuitry according to the measurement, the depth associated with the at least one feature at a pixel of the at least two images. In some embodiments, the method includes generating, by the processing circuitry, a confidence metric associated with the depth at the pixel. In some embodiments, the method includes determining, by the processing circuitry, the depth by performing fewer than 700 floating point operations (FLOPs). In some embodiments, the method includes at least one of: passing, using a bandpass filter, coherent light to the metalens for manipulation, or extending, using the bandpass filter, an operating range or distance of the metalens from a physical location of the at least one feature, to determine the depth of the at least one feature. In some embodiments, the method includes passing, by an aperture, a portion of available light to the metalens for manipulation. In some embodiments, determining the depth includes calculating a number of depth estimations for the at least one feature, calculating a confidence metric for each of the number of depth estimations, and selecting a depth estimation from the number of depth estimations according to the confidence metric for each of the number of depth estimations. In some embodiments, calculating the number of depth estimations includes performing a gradient descent calculation. In some embodiments, the method includes performing, by the photosensor, the measurement of the at least two images simultaneously.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Figure 1:
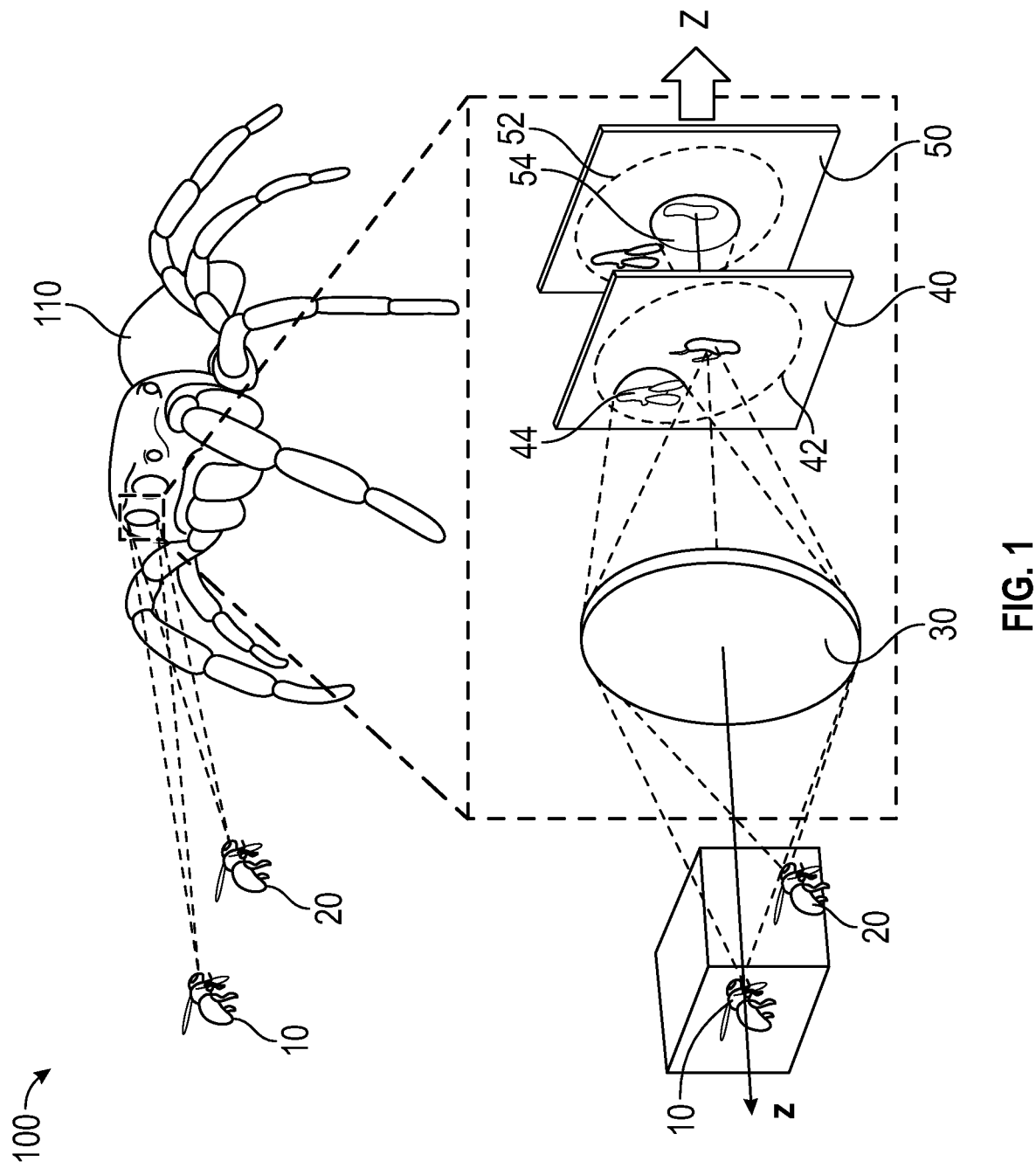
FIG. 1 is a perspective view illustrating a jumping spider determining a depth using a layered retina, according to an example embodiment.

Hereinafter, example embodiments will be described in more detail with reference to the accompanying drawings.

Depth sensing (e.g., determining distances to objects in an image, etc.) is often useful and/or necessary in various fields. For example, autonomous driving systems may capture images of the surroundings of a vehicle and determine distances to objects in the images to avoid collision. Depth sensors often rely on optical instruments such as an aperture, lens, and photosensor to capture information to generate depth measurements. For example, a camera may capture an image used to generate a depth measurement. Traditionally, depth sensing is achieved by capturing an image having a first depth of field (e.g., focal distance, etc.), operating a lens (e.g., mechanically interacting with a diffractive lens, etc.) to achieve a second depth of field, capturing an image having the second depth of field, and comparing the first and second images to determine a distance to an object in the first and second images. Such a system may suffer from poor exposure, lack of contrast in the images, or object motion. For example, a traditional depth sensor may introduce a time delay between capturing the first image and the second image during which objects in the image may have moved (e.g., obstacles in a dynamic scene such as a high speed car pursuit, etc.) which may make comparisons between the images difficult, thereby impairing and/or thwarting traditional depth sensing techniques. Therefore, systems and methods for improved depth sensing/depth detection are needed.

One solution includes a metalens depth sensor. The metalens depth sensor may solve many problems inherent with traditional depth sensors/techniques that rely on diffractive lenses. For example, the metalens depth sensor of the present disclosure may capture two images simultaneously (e.g., in "one shot," at the same time, concurrently, in parallel, within a very short period of time, etc.) thereby eliminating the time delay introduced by traditional depth sensing systems. Moreover, the metalens depth sensor may include no moving parts, thereby eliminating mechanical problems associated with traditional depth sensing systems using diffractive lenses. In various embodiments, the metalens depth sensor may have small form factor. For example, the metalens depth sensor may include a metalens having a 3 mm diameter, thereby enabling depth detection on micro and/or lightweight platforms such as micro-drones where traditional depth sensing systems may be prohibitively large. In various embodiments, the metalens depth sensor facilitates computational efficiencies over traditional depth sensing systems. For example, by facilitating the simultaneous capture of one or more images having different depths of field, various computational techniques (e.g., gradient based optimization such as gradient descent, etc.) may be employed to reduce the number of operations (e.g., floating point operations, etc.) required to determine a depth measurement. For example, the metalens depth sensor may facilitate determining a depth value associated with a pixel in fewer than 700 floating-point-operations (FLOPs). For context, an efficient implementation of a binocular stereo algorithm involves about 7000 FLOPs per output pixel and a system-on-chip implementation of the Lucas-Kanade optical flow algorithm (with spatial dependence similar to that of the proposed sensor) involves over 2500 FLOPs per pixel. In various embodiments, the metalens depth sensor of the present disclosure improves the functioning of computers by reducing computational overhead and/or improving memory utilization (e.g., by reducing the number of instruction register read/write operations, etc.). In various embodiments, the metalens depth sensor of the present disclosure conserves energy by requiring fewer computational steps than traditional depth sensing systems. Additionally or alternatively, because the metalens depth sensor may not require operation of any mechanical components, the metalens depth sensor may further conserve power as compared to traditional depth sensing systems.

Referring now to FIG. 1, environment 100 is shown illustrating depth detection in a jumping spider. Environment 100 includes a jumping spider (Salticidae), shown as spider 110, and two flies, shown as first object 10 and second object 20. Spider 110 may rely on accurate depth perception for predation and navigation. In various embodiments, spider 110 has a corneal lens, shown as lens 30, and specialized multi-tiered retina, shown as first retina 40 and second retina 50. First retina 40 and second retina 50 may receive images with different amounts of defocus shown as first image 42 and second image 52. Spider 110 may determine distances associated with first object 10 and second object 20 based on the differential focus of first object 10 and second object 20 in first image 42 and second image 52, shown as first object image 44 and second object image 54.

Figure 2:
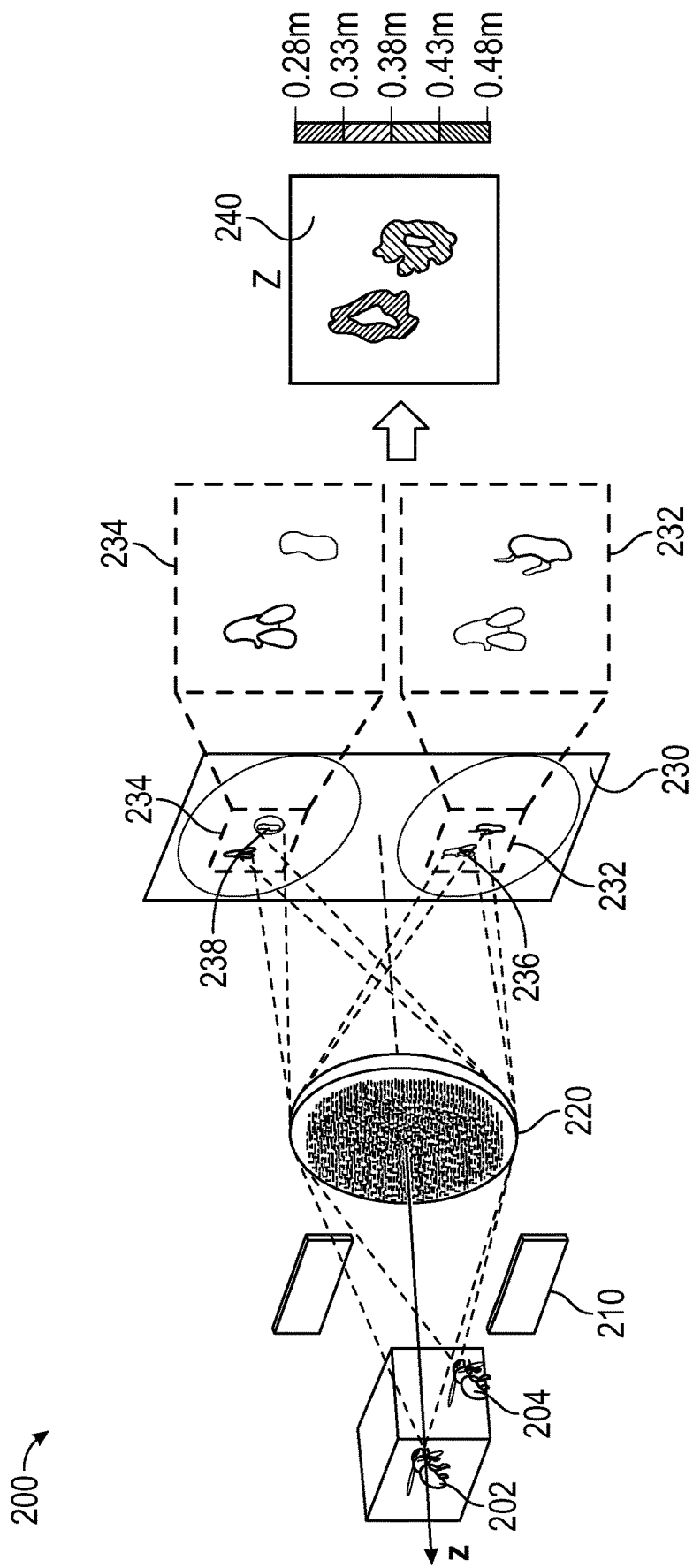
FIG. 2 is a perspective view illustrating a system for determining a depth using a metalens, according to an example embodiment.

Referring now to FIG. 2, system 200 is shown illustrating depth detection using a metalens. System 200 may determine a depth associated with first object 202 and second object 204. In brief summary, system 200 may (i) collect light from first object 202 and second object 204, (ii) generate first image 232 and second image 234 based on the collected light, wherein first image 232 and second image 234 have different amounts of defocus, and (iii) determine a depth associated with first object 202 and second object 204 based on analyzing first image 232 and second image 234. In various embodiments, system 200 generates depth map 240. Depth map 240 may include a depth associated with one or more features in an image. For example, depth map 240 may include a depth associated with each pixel in an image (e.g., each pixel in an image of first object 202 and second object 204, etc.). System 200 may include aperture 210, metalens 220, and/or photosensor 230. In various embodiments, metalens 220 is positioned between aperture 210 and photosensor 230. In some embodiments, system 200 includes one or more optical filters such as a bandpass filter configured to pass a portion of available light corresponding to a specific wavelength and/or range of wavelengths. For example, system 200 may include a bandpass filter positioned between incident light and photosensor 230 configured to pass a specific range of light wavelengths (e.g., 10 nm centered at 532 nm, etc.) to photosensor 230.

Aperture 210 may pass a portion of available light to metalens 220. For example, aperture 210 may reduce a light collection efficiency for off-axis incident angles. In some embodiments, aperture 210 is a rectangular, square, diamond-shape or other shaped aperture. Additionally or alternatively, aperture 210 may be any other shape such as circular, elliptical, etc. In various embodiments, aperture 210 may at least partially prevent overlap between one or more images (e.g., first image 232, second image 234, etc.). In some embodiments, aperture 210 has an irradiance between about 0.3 mW/m² and 0.5 W/m² (e.g., within the working bandwidth). In some embodiments, system 200 does not include aperture 210. For example, system 200 may use a polarization sensitive metalens in addition to or as a substitute to aperture 210. In various embodiments, aperture 210 receives incident light and allows a portion of the incident light to pass to metalens 220. In some embodiments, aperture 210 may extend an operating range or distance of metalens 220 from a physical location of a feature. For example, aperture 210 may extend an operating range (e.g., minimum operating distance, etc.) from 5 cm to 10 cm. In various embodiments, use and/or modification of aperture 210 may change an operating range of system 200. For example, introduction of aperture 210 may change an effective operating range (e.g., a distance from photosensor 230 to an object being measured, etc.) of system 200 from 0-10 cm to 5-15 cm. In some embodiments, use of aperture 210 may facilitate passing more light resulting in brighter images and/or more accurate depth determinations.

Metalens 220 may modify/manipulate incident light. For example, metalens 220 may modify a phase of incident light at a subwavelength scale. Additionally or alternatively, metalens 220 may manipulate light by controlling a phase, amplitude, polarization, depth of field, direction, and/or the like of the light. In some embodiments, metalens 220 spatially multiplexes incident light to produce one or more images each having a corresponding depth of field. For example, metalens 220 may split incident light to concurrently or simultaneously form two differently-defocused images at distinct regions of a single planar photosensor (e.g., photosensor 230, etc.). In various embodiments, metalens 220 is or includes a metasurface. A metasurface may be an ultrathin planar optical component composed of subwavelength-spaced nanostructures patterned at an interface. In various embodiments, the individual nanostructures facilitate controlling phase, amplitude and polarization of a transmitted wavefront at subwavelength scales (e.g., allowing multiple functions to be multiplexed within a single device, etc.). Metalens 220 may be constructed of or otherwise include titanium dioxide (TiO2) nanopillars.

In some embodiments, metalens 220 is approximately 3 mm in diameter and 1.5 mm in thickness. However, it should be understood that metalens 220 may be any shape and/or size. In various embodiments, metalens 220 modifies incident light to produce a first image 232 having first depth of field 236 and a second image 234 having second depth of field 238 on photosensor 230. First depth of field 236 may correspond to a first in-focus area of an image and second depth of field 238 may correspond to a second in-focus area of an image. For example, a first image may have a first depth of field in which the foreground is in-focus and a second image may have a second depth of field in which the background is in-focus. First image 232 and second image 234 may be analyzed by system 200 to determine a depth (e.g., a distance to first object 202 and second object 204, etc.) associated with one or more features (e.g., spatially separated point(s) or element(s), or three-dimensional structure(s)) in first image 232 and second image 234. In some embodiments, the depth is measured from a front surface of photosensor 230 to the feature, or between two features/points from the first image 232 and the second image 234 respectively. However, it should be understood that other distance measurements are possible (e.g., from a front surface of metalens 220 to the feature, etc.). In various embodiments, metalens 220 produces one or more images on different portions (e.g., different/non-overlapping areas, sections, pixels) of photosensor 230. For example, metalens 220 may produce a first image on a first portion of photosensor 230 and a second image on a second portion of photosensor 230.

Photosensor 230 may measure incident light. In various embodiments, photosensor 230 is a digital photosensor configured to measure various parameters associated with incident light such as intensity, wavelength, phase, etc. Photosensor 230 may be a charge-coupled device (CCD), complimentary metal-oxide-semiconductor (CMOS) device, and/or any other photosensor known in the art. In some embodiments, photosensor 230 has a high frame rate (e.g., 160 frames-per-second, etc.). In various embodiments, photosensor 230 generates a measurement of first image 232 and/or second image 234. For example, photosensor 230 may generate a measurement including intensity values. Additionally or alternatively, photosensor 230 may generate a measurement including color values. System 200 may analyze the measurement from photosensor 230 to generate depth map 240.

Figures 3A, 3B:
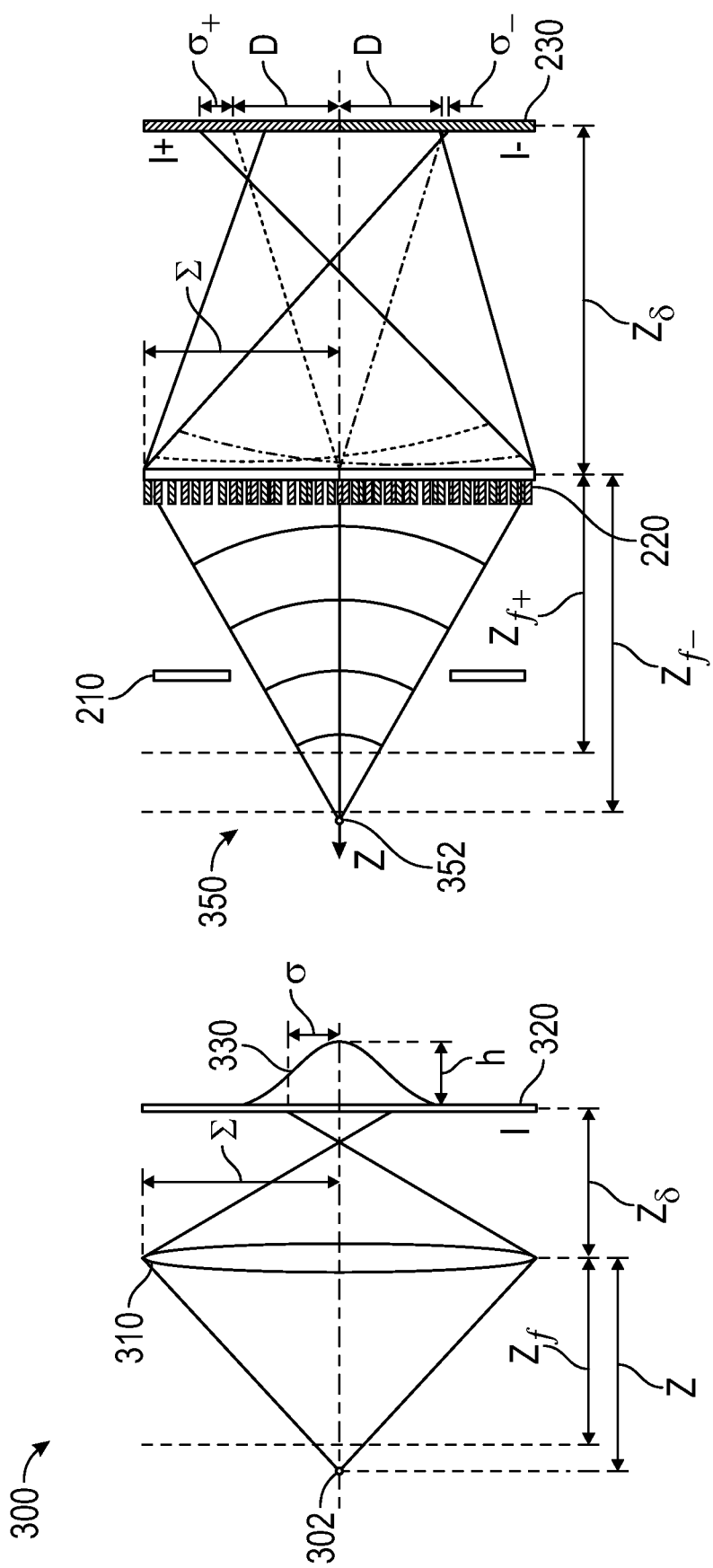
FIG. 3A is a diagram illustrating a point-spread-function (PSF) of a diffractive lens, according to an example embodiment.
FIG. 3B is a diagram illustrating a PSF of a metalens, according to an example embodiment.

Referring now to FIG. 3A, setup 300 illustrates a point-spread-function (PSF) of a diffractive lens, according to an example embodiment. In various embodiments, setup 300 illustrates a diffractive lens used in a traditional depth sensing system. Setup 300 includes point source 302, diffractive lens 310, photosensor 320, and PSF 330. As can be seen by PSF 330, diffractive lens 310 may receive incident light and modify the incident light to produce a single image (e.g., seen at the Gaussian curve on photosensor 320) having a single depth of field. In various embodiments, to capture multiple images (e.g., two images, etc.) having different depths of field, diffractive lens 310 must be moved relative to photosensor 320. Therefore, in various embodiments, traditional depth sensing systems (e.g., those using diffractive lenses such as setup 300, etc.) may be required to capture one or more images sequentially (e.g., one after another, etc.). This may introduce various complications as discussed above (e.g., object movement, blur, etc.). In various embodiments, $\sigma$ is a point spread function h (PSF) width, Z is a depth (the object distance), $Z_s$ is the distance between the lens and the photosensor, $Z_f$ is the in-focus distance, and $\Sigma$ is the entrance pupil (lens) radius.

Referring now to FIG. 3B, setup 350 illustrates an improved system for capturing one or more images that may be implemented in a depth sensing system, according to an example embodiment. In various embodiments, setup 350 illustrates a metalens used in a depth sensing system. Setup 350 may solve many of the issues inherent to setup 300. Setup 350 includes point source 352, aperture 210, metalens 220, and photosensor 230. Metalens 220 may encode the phase profiles of two thin lenses in one aperture. The two effective lenses may have distinct in-focus distances ($Z_{f+}$, $Z_{f-}$) and off-axis alignments that can create two adjacent images ($I_+$, $I_-$) with different PSF widths ($\sigma_+$, $\sigma_-$). The effective image centers are shifted from the optical axis by $\pm D$. One of skill in the art shall appreciate that the spatial multiplexing of metalens 220 may not be achievable using traditional lenses (e.g., Fresnel lenses, diffractive lenses, etc.). For example, metalens 220 may simultaneously or concurrently produce/establish/form two images each having a different depth of field. Setup 350 may facilitate generating a depth measurement based on the two images. For example, a depth measurement may be calculated by (i) generating a per-pixel mean $I=1/2(I_++I_-)$ and difference $\delta I = I_+ - I_-$, (ii) taking a Laplacian of the average image $\nabla^2 I(x,y)$ computed by convolving the average image with a discrete Laplacian filter, and (iii) convolving with a bandpass filter F to attenuate noise and vignetting.

Figure 4:
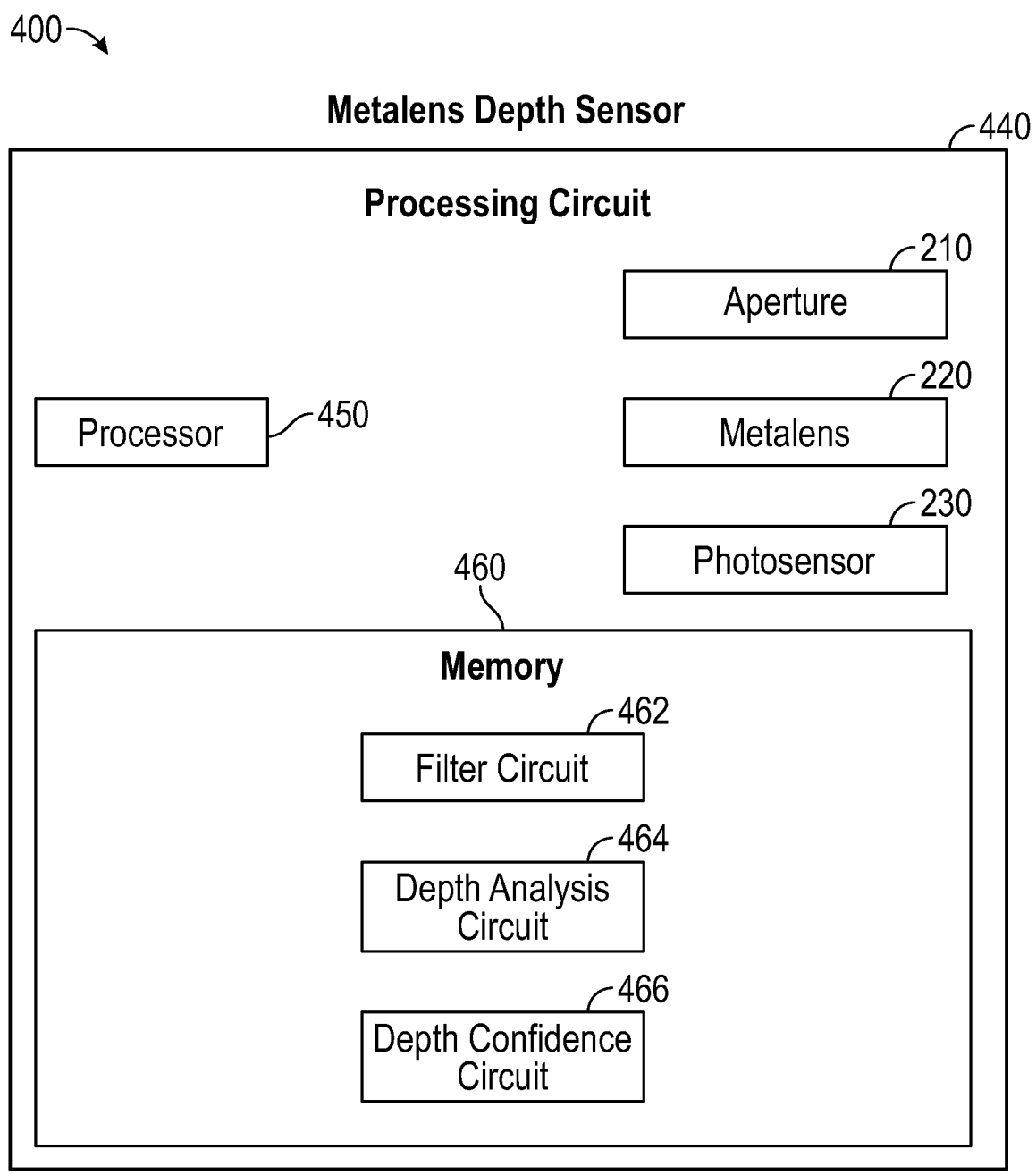
FIG. 4 is a block diagram illustrating a metalens depth sensor, according to an example embodiment.

Referring now to FIG. 4, metalens depth sensor 400 is shown, according to an example embodiment. Metalens depth sensor 400 may image, capture and/or map a scene and generate one or more depth estimations associated with elements of the scene. For example, metalens depth sensor 400 may image a scene of a bowling ball and may determine depths associated with various features in the image (e.g., a point on a table the bowling ball is resting on, a point on the bowling ball, etc.). In various embodiments, metalens depth sensor 400 tunes/adjusts/updates one or more parameters used to determine depth. For example, metalens depth sensor 400 may calibrate/tune itself using simulated training data. Metalens depth sensor 400 is shown to include aperture 210, metalens 220, photosensor 230, and processing circuit 440. Additionally or alternatively, metalens depth sensor 400 may include an optical filter as described above. In some embodiments, a spectral bandwidth of metalens depth sensor 400 may be expanded using achromatic metalenses. In various embodiments, metalens depth sensor 400 is a passive-lighting depth sensing system. For example, instead of generating and measuring a light source such as in a LIDAR system, metalens depth sensor 400 may receive passive light (e.g., ambient light incident from one or more objects, etc.) and determine a depth using the passive light.

Processing circuit 440 may include processor 450 and memory 460. Memory 460 may have instructions stored thereon that, when executed by processor 450, cause processing circuit 440 to perform the various operations described herein. The operations described herein may be implemented using software, hardware, or a combination thereof. Processor 450 may include a microprocessor, ASIC, FPGA, etc., or combinations thereof. In many embodiments, processor 450 may be a multi-core processor or an array of processors. Memory 460 may include, but is not limited to, electronic, optical, magnetic, or any other storage devices capable of providing processor 450 with program instructions. Memory 460 may include a floppy disk, CDROM, DVD, magnetic disk, memory chip, ROM, RAM, EEPROM, EPROM, flash memory, optical media, or any other suitable memory from which processor 450 can read instructions. The instructions may include code from any suitable computer programming language such as, but not limited to, C, C++, C #, Java, JavaScript, Perl, HTML, XML, Python and Visual Basic.

Memory 460 may include filter circuit 462, depth analysis circuit 464, and depth confidence circuit 466. Filter circuit 462 may implement one or more analog and/or digital filters. For example, filter circuit 462 may implement a digital bandpass filter. In some embodiments, filter circuit 462 implements a Fast Fourier Transform (FFT) or other algorithm to facilitate frequency domain manipulation. Depth analysis circuit 464 may calculate one or more depths associated with a feature in an image. For example, depth analysis circuit 464 may receive sensor data from photosensor 230 associated with one or more images and can generate/determine/compute a depth associated with pixels in the one or more images. In various embodiments, depth analysis circuit 464 determines a depth based on analyzing differential focus associated with one or more images. For example, depth analysis circuit 464 may receive image data describing a first image having a first depth of focus and a second image having a second depth of focus and may determine a depth associated with each pixel in a combined image based on the first and second images. In various embodiments, depth analysis circuit 464 may compute a depth value associated with a pixel in fewer than 700 floating-point-operations (FLOPs). For example, depth analysis circuit 464 may generate a per-pixel mean and difference and convolve an average of the image with a discrete Laplacian filter. In various embodiments, depth analysis circuit 464 reduces computational overhead by tuning function parameters using back-propagation and stochastic gradient descent (e.g., because the computation is end-to-end differentiable unlike other systems which may require manual tuning, etc.). In various embodiments, the depth value associated with each pixel is based on the intensity values (e.g., as measured by photosensor 230, etc.) in a 25×25 spatial neighborhood of pixels.

Depth confidence circuit 466 may calculate one or more confidence metrics associated with features in an image. For example, depth confidence circuit 466 may receive sensor data from photosensor 230 associated with one or more images and can generate a confidence metric associated with a depth associated with a pixel in the one or more images. In various embodiments, depth confidence circuit 466 generates a confidence metric for each pixel in an image. For example, depth confidence circuit 466 may generate a confidence metric associated with each depth estimation corresponding to each pixel in an image. In some embodiments, depth analysis circuit 464 uses the confidence metric to determine a depth. For example, depth analysis circuit 464 may generate a number of depth estimations for a pixel in an image, depth confidence circuit 466 may generate a confidence metric associated with each of the depth estimations, and depth analysis circuit 464 may select the depth estimation having the highest confidence (e.g., as indicated by the confidence metric, etc.). The confidence metric may be associated with a likelihood that depth estimation is accurate (e.g., that a depth estimation corresponds to the true depth of the feature, etc.).

Figure 5:
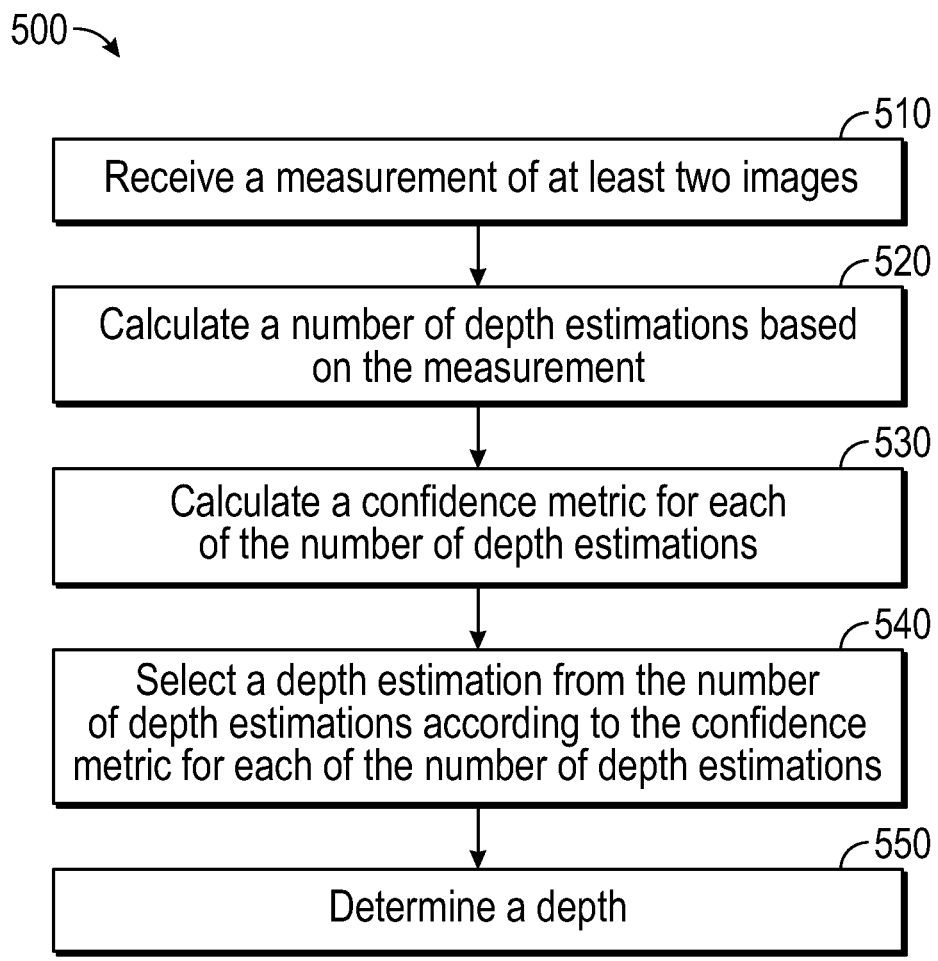
FIG. 5 is a flow diagram illustrating a method of determining a depth using the metalens depth sensor of FIG. 4, according to an example embodiment.

Referring now to FIG. 5, method 500 for determining a depth is shown, according to an example embodiment. In various embodiments, metalens depth sensor 400 implements method 500. At step 510, metalens depth sensor 400 may receive a measurement of at least two images. In various embodiments, step 510 includes capturing an image (e.g., using photosensor 230, etc.). In some embodiments, step 510 includes taking a "single shot" that includes one or more images. For example, light representing two images may be simultaneously projected on a single photosensor (e.g., such that they don't overlap) and therefore a single measurement of the photosensor may simultaneously capture two images. In various embodiments, the two images depict the same or approximately the same scene but have different depths of field. In various embodiments, one or more images may be simultaneously/concurrently captured that have similar characteristics (e.g., framing, exposure, zoom, shutter speed, orientation, etc.). In various embodiments, step 510 includes simultaneously capturing two images I+(x, y), and I−(x, y) with different in-focus distances (Zf+, Zf−). In various embodiments the difference in blur between the images, $$\delta\sigma = \sigma_+ - \sigma_- = \sum Z_s \left( \frac{1}{Z_{f+}} - \frac{1}{Z_{f-}} \right),$$

is small and approximately differential.

At step 520, metalens depth sensor 400 calculates a number of depth estimations based on the measurement. For example, metalens depth sensor 400 may calculate a depth estimation for one or more features in an image. In various embodiments, step 520 includes calculating a depth estimation for one or more pixels in an image (e.g., of the at least two images, or a composite thereof, etc.). In some embodiments, a depth value Z is computed at each pixel (x, y) according to:

$$Z(x, y) = \left(\alpha + \beta \frac{F(x, y) * \delta I(x, y)}{F(x, y) * \nabla^2 (x, y)}\right)^{-1}$$

where $$\alpha = \frac{1}{2}\left(\frac{1}{Z_{f+}} + \frac{1}{Z_{f-}}\right), \beta = -\left(\sum Z_s \delta \sigma\right)^{-1}, F(x, y)$$

is a linear filter, and $\delta I(x, y) = I_+(x, y) - I_-(x, y)$.

At step 530, metalens depth sensor 400 calculates a confidence metric for each of the number of depth estimations. For example, metalens depth sensor 400 may calculate a confidence metric for each of the one or more depth estimations associated with the one or more features in an image. In various embodiments, step 530 includes calculating a confidence metric associated with each depth estimation associated with an image. For example, metalens depth sensor 400 may calculate a number of depth estimations associated with a single pixel in an image and step 530 may include generating a confidence metric for each of the number of depth estimations. In some embodiments, step 530 includes determining a number of confidence metrics associated with a number of depth estimations associated with a number of pixels in an image.

At step 540, metalens depth sensor 400 selects a depth estimation from the number of depth estimations according to the confidence metric for each of the number of depth estimations. In various embodiments, step 540 includes selecting the depth estimation having the highest estimated accuracy as indicated by the associated confidence metric. In some embodiments, step 540 includes selecting the depth estimation having the highest confidence value in the confidence metric. In some embodiments, step 540 includes selecting a number of depth estimations. For example, a depth estimation may be selected for each feature in an image such as each pixel in an image.

In some embodiments, step 540 includes determining an error $s_z(x, y)$ associated with each depth value $Z(x, y)$ according to:

$$s_z(x,y) = |\gamma 1||F*\delta I(x,y)| + \gamma^2 |F(x,y)*\nabla^2 I(x,y)|^{-1} + \gamma^3|$$

where γ1, γ2, γ3 are constants determined by the optics. In various embodiments, $s_z(x, y)$ is normalized to the range (0, 1) which may represent a confidence C(x, y). In various embodiments, a higher confidence value C at pixel location (x, y) indicates a smaller value of $s_z$ and a more accurate depth measurement Z. In various embodiments, the confidence C(x, y) characterizes the expected accuracy of the measurement at each pixel (x, y) (e.g., a larger confidence value C(x, y) at a pixel indicates a statistically smaller error in the depth measurement, etc.).

At step 550, metalens depth sensor 400 may determine a depth. In various embodiments, the depth is the depth estimation selected during step 540. In various embodiments, step 550 includes generating a depth map including a depth estimation associated with each feature in an image. For example, step 550 may include generating a depth map illustrating a depth associated with each pixel in an image. In some embodiments, step 550 includes performing a gradient-based optimization such as gradient descent. In various embodiments, the depth map is modified using the confidence metrics to display only depth values associated with a confidence value above a threshold. For example, the depth map may be thresholded by selectively showing pixels with confidence values greater than 0.5.

Additionally or alternatively, step 550 may include analyzing one or more depth and confidence maps (e.g., to increase resolution and/or accuracy, etc.). For example, step 550 may include analyzing nine separate depth and confidence maps using distinct and complimentary spatial filters $F_i$, and then fusing the nine "channels" into one. In various embodiments, step 550 may include calibrating one or more parameters. For example, parameters (e.g., variable values in any of the equations above) may be tuned using back-propagation and/or gradient descent.

Figure 6:
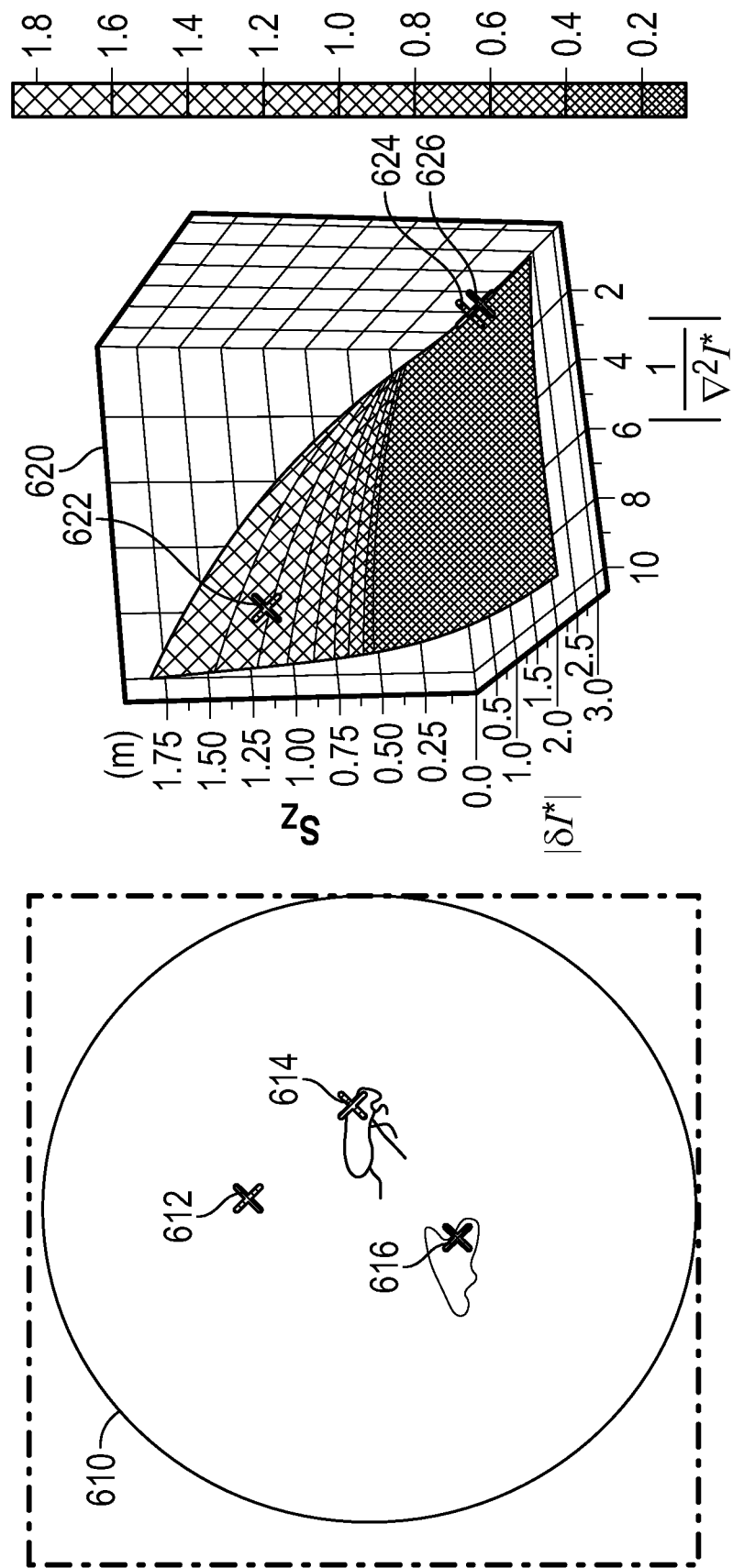
FIG. 6 is a diagram illustrating a confidence map determined using the metalens depth sensor of FIG. 4 and various points on an image corresponding to the confidence map, according to an example embodiment.

Referring now to FIG. 6, generation of confidence map 620 from image 610 is shown, according to an example embodiment. In various embodiments, metalens depth sensor 400 generates confidence map 620 as described above. Metalens depth sensor 400 may receive image 610 having elements 612-616 and may generate confidence map 620 with points 622-626 corresponding to elements 612-616. For example, element 614 in a high contrast portion of image 610 may be represented by point 624 in a high confidence portion of confidence map 620. In various embodiments, metalens depth sensor 400 uses confidence map 620 to generate depth values for pixels in image 610. In some embodiments, metalens depth sensor 400 is configured to utilize a multi-scale filtering approach to handle image textures at different spatial frequencies and/or take advantage of confidence map 620 to merge all different spatial scales together. For example, metalens depth sensor 400 may generate a number of different depth maps and confidence maps, each associated with a different filter (e.g. spatial scale), and merge the number of different depth maps and confidence maps together to achieve improved depth estimation across a variety of image features. For example, metalens depth sensor 400 may generate a first depth map using a first filter to produce depth estimations having corresponding confidence metrics of a first value for a first texture (e.g., of an object being imaged, etc.), may generate a second depth map using a second filter to produce depth estimations having corresponding confidence metrics of a second value for a second texture, and may combine the first and second depth maps to produce a composite depth map having depth values associated with the highest confidence values of each (e.g., to better estimate depth across all textures, etc.) of the first and second depth maps.

Figure 7:
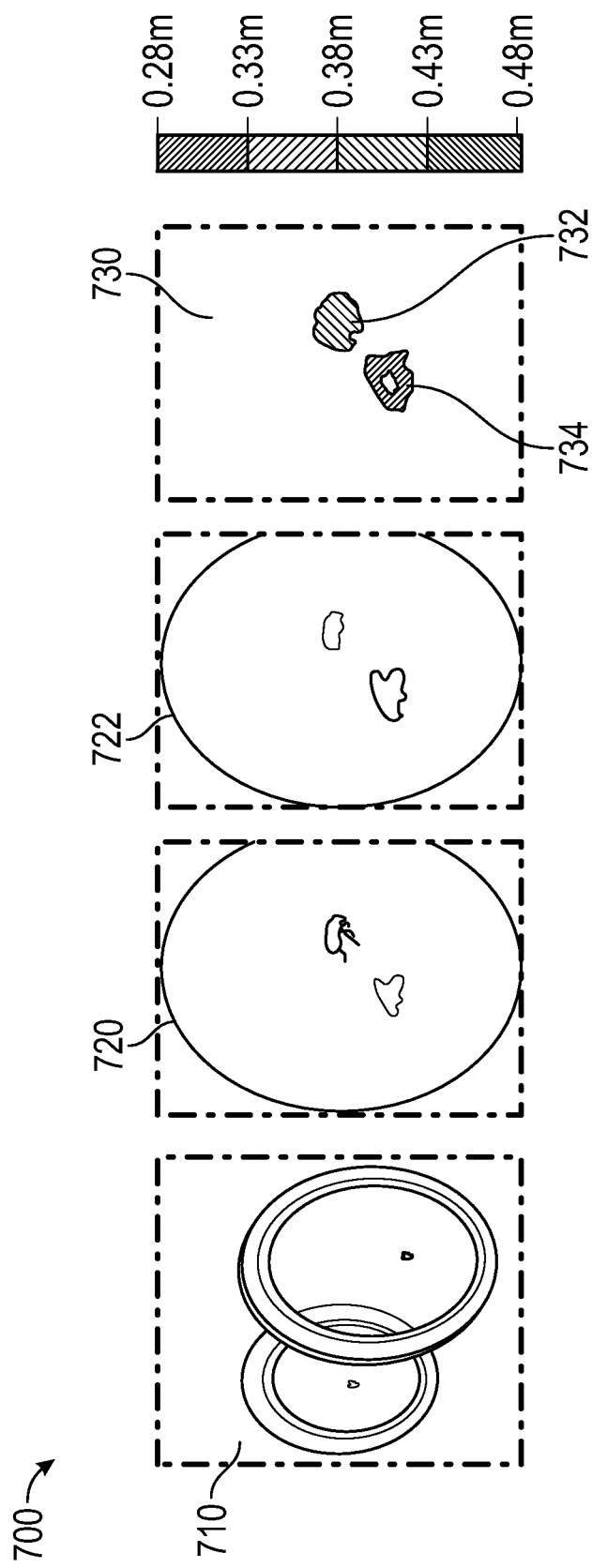
FIG. 7 is a diagram illustrating a depth map generated using the metalens depth sensor of FIG. 4 associated with an image, according to an example embodiment.

Referring now to FIG. 7, an example implementation 700 of determining a depth map is shown, according to an example embodiment. In various embodiments, metalens depth sensor 400 captures first image 720 and second image 722 of scene 710. First image 720 may be associated with a first depth of field and second image 722 may be associated with a second depth of field. In various embodiments, first image 720 and second image 722 are formed and/or captured simultaneously (e.g., using a "single shot" of a photosensor such as photosensor 230, etc.). In various embodiments, first image 720 and/or second image 722 are associated with a first filter. For example, first image 720 and second image 722 may be captured using a first optical bandpass filter. In some embodiments, one or more additional images are captured. For example, sets of first image 720 and second image 722 may be captured using different optical filters. Metalens depth sensor 400 may generate a number of depth estimations associated with each pixel of the captured images (e.g., first image 720, second image 722, etc.). In various embodiments, metalens depth sensor 400 may generate a confidence metric associated with each of the number of depth estimations. Using the number of depth estimations and the number of confidence metrics, metalens depth sensor 400 may generate depth map 730 including a depth associated with each pixel (or other unit or image element) in the image. For example, depth map 730 may include a depth associated with first pixel 732 (e.g., a pixel associated with an image of a first fly from scene 710) and a depth associated with second pixel 734 (e.g., a pixel associated with an image of a second fly from scene 710 that is behind the first fly from scene 710 relative to the photosensor). In various embodiments, the process of determining depth map 730 is end-to-end differentiable. Therefore, metalens depth sensor 400 may automatically tune/adjust function parameters (e.g., rather than tuning the function parameters manually, etc.). For example, the function parameters may be tuned using back-propagation and stochastic gradient descent.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As used herein, "simultaneously" may refer to one or more actions occurring at the same time, within a short period of time (e.g., within 2 ms, etc.), or partially overlapping in time (e.g., two portions from two images respectively measured at the same time, etc.). For example, simultaneously capturing a first and second image may refer to capturing the first and second images during a period of time required to read data from a digital photosensor (e.g., wherein the data relates to the first and second images, etc.).

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A depth sensor for determining depth, comprising:
   a photosensor;
   a metalens configured to receive light and diffract the light such that a first image is diffracted in a first direction and a second image is diffracted in a second direction to simultaneously produce:
      the first image and the second image having different focal distances on a surface of the photosensor;
      the first image on a first portion of the photosensor; and
      the second image on a second portion of the photosensor different from the first portion of the photosensor; and
   processing circuitry configured to:
      receive, from the photosensor, a measurement of the first image and the second image having different focal distances; and
      determine, according to the measurement, a depth associated with at least one feature in the first image and the second image.

2. The depth sensor of claim 1, wherein the processing circuitry is configured to determine the depth associated with the at least one feature at a pixel of the first image and the second image.

3. The depth sensor of claim 2, wherein the processing circuitry is configured to generate a confidence metric associated with the depth at the pixel.

4. The depth sensor of claim 1, further comprising a filter configured to at least one of: pass coherent light to the metalens for manipulation, or extend an operating range or distance of the metalens from a physical location of the at least one feature, to determine the depth of the at least one feature.

5. The depth sensor of claim 4, wherein the filter comprises a bandpass filter.

6. The depth sensor of claim 1, further comprising an aperture configured to pass a portion of available light to the metalens for manipulation, wherein the metalens is positioned between the aperture and the photosensor.

7. The depth sensor of claim 1, wherein the processing circuitry is configured to determine the depth by:
   calculating a plurality of depth estimations for the at least one feature;
   calculating a confidence metric for each of the plurality of depth estimations; and
   selecting a depth estimation from the plurality of depth estimations according to the confidence metric for each of the plurality of depth estimations.

8. The depth sensor of claim 7, wherein the processing circuitry is configured to calculate the plurality of depth estimations by performing a gradient descent calculation.

9. The depth sensor of claim 1, wherein the photosensor is configured to perform the measurement of the first image and the second image simultaneously.

10. The depth sensor of claim 1, wherein the first image and the second image are produced on different portions of the surface of the photosensor.

11. A method for determining depth, comprising:
receiving light;
diffracting the light, using a metalens, such that a first image is diffracted in a first direction and a second image is diffracted in a second direction to simultaneously produce:
the first image and the second image having different focal distances on a surface of a photosensor;
the first image on a first portion of the photosensor; and
the second image on a second portion of the photosensor different from the first portion of the photosensor;
receiving, by processing circuitry from the photosensor, a measurement of the first image and the second image having different focal distances; and
determining, by the processing circuitry according to the measurement, a depth associated with at least one feature in the first image and the second image.

12. The method of claim 11, further comprising determining, by the processing circuitry according to the measurement, the depth associated with the at least one feature at a pixel of the first image and the second image.

13. The method of claim 12, further comprising generating, by the processing circuitry, a confidence metric associated with the depth at the pixel.

14. The method of claim 11, further comprising at least one of:
passing, using a bandpass filter, coherent light to the metalens for manipulation; or
extending, using the bandpass filter, an operating range or distance of the metalens from a physical location of the at least one feature, to determine the depth of the at least one feature.

15. The method of claim 11, further comprising passing, by an aperture, a portion of available light to the metalens for manipulation.

16. The method of claim 11, wherein determining the depth comprises:
calculating a plurality of depth estimations for the at least one feature;
calculating a confidence metric for each of the plurality of depth estimations; and
selecting a depth estimation from the plurality of depth estimations according to the confidence metric for each of the plurality of depth estimations.

17. The method of claim 16, wherein calculating the plurality of depth estimations comprises performing a gradient descent calculation.

18. The method of claim 11, further comprising performing, by the photosensor, the measurement of the first image and the second image simultaneously.

\* \* \* \* \*